(12) United States Patent
Schellhorn et al.

(10) Patent No.: US 12,267,153 B2
(45) Date of Patent: Apr. 1, 2025

(54) FRAME SCHEDULING BASED ON AN ESTIMATED DIRECT MEMORY ACCESS (DMA) LATENCY AND APPARATUS FOR TIME AWARE FRAME SCHEDULING

(71) Applicant: NXP B.V., Eindhoven (NL)

(72) Inventors: Mark Andrew Schellhorn, Ottawa (CA); Bernard Francois St-Denis, Ottawa (CA); John Pillar, Ottawa (CA)

(73) Assignee: NXP B.V., Eindhoven (NL)

( * ) Notice: Subject to any disclaimer, the term of this patent is extended or adjusted under 35 U.S.C. 154(b) by 371 days.

(21) Appl. No.: 17/660,222

(22) Filed: Apr. 22, 2022

(65) Prior Publication Data

US 2023/0344539 A1 Oct. 26, 2023

(51) Int. Cl.
G06F 13/28 (2006.01)
H04J 3/06 (2006.01)

(52) U.S. Cl.
CPC .......... *H04J 3/0667* (2013.01); *G06F 13/287* (2013.01); *H04J 3/0697* (2013.01)

(58) Field of Classification Search
CPC ...... H04J 3/0667; H04J 3/0697; G06F 13/287
See application file for complete search history.

(56) References Cited

U.S. PATENT DOCUMENTS

| | | | |
|---|---|---|---|
| 9,367,496 B2 * | 6/2016 | Kobori | G06F 13/28 |
| 10,754,816 B2 | 8/2020 | Kasichainula | |
| 2012/0075999 A1 * | 3/2012 | Ko | H04L 45/28 |
| | | | 370/252 |
| 2013/0159449 A1 * | 6/2013 | Taylor | G06F 9/54 |
| | | | 709/212 |
| 2014/0023048 A1 * | 1/2014 | Vu | H04B 7/26 |
| | | | 370/336 |
| 2014/0150014 A1 * | 5/2014 | Aitken | H04H 20/423 |
| | | | 725/109 |
| 2019/0205244 A1 * | 7/2019 | Smith | G06F 3/065 |
| 2021/0014177 A1 | 1/2021 | Kasichainula | |
| 2021/0117353 A1 * | 4/2021 | Kasichainula | G06F 13/28 |
| 2022/0191469 A1 * | 6/2022 | Haskin | H04N 17/002 |
| 2022/0318604 A1 * | 10/2022 | Xu | G06N 3/04 |
| 2024/0172156 A1 * | 5/2024 | Grau | H04W 56/0045 |

FOREIGN PATENT DOCUMENTS

CN 105099932 A * 11/2015

OTHER PUBLICATIONS

NXP Semiconductor, "Layerscape® 1028A Applications Processor," https://www.nxp.com/products/processors-and-microcontrollers/arm-processors/layerscape-processors/layerscape-1028a-applications-processor:LS1028A, downloaded from the internet Apr. 7, 2022, 3 pages.

* cited by examiner

*Primary Examiner* — Atique Ahmed (57) ABSTRACT

A network station scheduling a frame to be transmitted by a transmitter of the network station at a transmit time. The transmit time is based on a first clock. A request is then issued to a direct memory access (DMA) circuit to retrieve the frame from a system memory. An advance time offset associated with the first clock is determined based on an estimated DMA latency of the DMA circuit. A frame retrieved by the DMA circuit is provided to a staging circuit. When a time of a second clock reaches the transmit time of the frame in the staging circuit, the frame is transmitted at the transmit time. In an example, a time of the first clock is ahead of a time of the second clock by the advance time offset.

15 Claims, 3 Drawing Sheets

FRAME SCHEDULING BASED ON AN ESTIMATED DIRECT MEMORY ACCESS (DMA) LATENCY AND APPARATUS FOR TIME AWARE FRAME SCHEDULING

FIELD OF USE

This disclosure generally relates to frame scheduling in time sensitive networks, and more particularly to frame scheduling based on an estimated direct memory access (DMA) latency.

BACKGROUND

Time sensitive networking (TSN) defined by IEEE 802.1Q-2018 offers a determinism in communication over IEEE 802.1 local area networks including guaranteed end-to-end latencies, limited latency fluctuations (jitter), and low frame loss. A network station that enables TSN has a scheduling circuit to transmit a frame over a local area network. The scheduling circuit reads the frame from a system memory using a direct memory access (DMA) circuit and causes the frame to be provided to a gating point in a staging circuit of the network station for transmission over the local area network.

BRIEF DESCRIPTION OF THE DRAWINGS

The drawings are for the purpose of illustrating example embodiments, but it is understood that the embodiments are not limited to the arrangements and instrumentality shown in the drawings.

DETAILED DESCRIPTION

A network station which implements time gate scheduling of IEEE 802.1Q-2018 as specified by time sensitive networking (TSN) has a system memory which stores frames that the network station is to transmit. The system memory might include different types of memory such as local static read access memory (SRAM), local system dynamic random access memory (DRAM), or remote DRAM each with different access latencies.

The network station needs to account for these latency differences to transmit the frames at predetermined transmit times. In some examples, the network station defines an advance time clock and a wall clock. The advance time clock is used to schedule a frame for transmission and the wall clock is used to determine when to transmit a frame. The time of the advance time clock is typically ahead of the time of the wall clock by an amount of time equal to a worst case frame retrieval time to read a frame from the system memory. A frame retrieval time is a time to retrieve a frame from the system memory based on one or more direct memory access (DMA) operations by a DMA circuit. Each DMA operation retrieves a portion of a frame, referred to as a data unit, and a plurality of DMA operations is typically performed to retrieve an entire frame. Further, each DMA operation has a DMA latency. The DMA latency is defined as a time between the DMA circuit issuing a request to read a data unit of the frame (e.g., portion of the frame) from the system memory and the DMA circuit receiving the data unit from the system memory. The worst case frame retrieval time is a worst case time to retrieve a frame from the system memory and is based on a worst case DMA latency of the DMA circuit.

A frame scheduling circuit of the network station schedules a frame for transmission if a gate state at a gating point of the network station is open at a time of the advance time clock. A transmit time is then assigned to the frame based on the time of the advance time clock. The frame scheduling circuit causes the DMA circuit to access the frame from the system memory and provide the frame to a staging circuit. The frame reaches the gating point in the staging circuit and when the wall clock indicates the transmit time of the frame the network station transmits the frame. The network station transmits frames in a same sequence and with the same timing that the frame scheduling circuit assigned based on the time of the advance time clock.

The worst case frame retrieval time is frequently much higher than a typical frame retrieval time for retrieving frames from the system memory resulting in increased number of frames in the staging circuit waiting to be transmitted. Further, determining the worst case frame retrieval time is difficult because the DMA latency varies with a load associated with the DMA circuit.

Embodiments disclosed herein are directed to determining an advance time offset of the advance time clock which is based on an estimated frame retrieval time and advancing the time of the advance time clock ahead of the time of the wall clock by the advance time offset instead of the worst case frame retrieval time. The estimated frame retrieval time is based on an estimated DMA latency which involves measuring a latency of the DMA circuit to retrieve a respective data unit from the system memory and combining measured DMA latencies in a window of time to form the estimated DMA latency. The window of time includes two or more DMA latency measurements and in an example the combination is an average of the DMA latency measurements. In one example, each latency measurement received over the window of time may be equally weighted and averaged. In another example, each latency measurement received over the window of time may be unequally weighted such that those more recently received latency measurements may be weighted more heavily such as based on an exponential weighted average (EWA). Further, if the window of time includes most recent DMA latency measurements, the average may be a moving average or weighted moving average (WMA) of DMA latency measurements. The estimated frame retrieval time is also based on a maximum frame size and maximum size of the data unit retrieved by the DMA circuit.

In one example, the sum of the estimated frame retrieval time and a fixed delay is the advance time offset. The fixed delay accounts for delays in the staging circuit until the frame is transmitted and outlier DMA latencies longer than indicated by the estimated DMA latency. In another example, the advance time offset is the estimated frame retrieval time. The time of the advance time clock is set to be ahead of the time of the wall clock by the advance time offset and a frame is scheduled for transmission at a time of the advance time clock when a gate state of the gating point of the staging circuit is open to transmit the frame, referred to as the transmit time. Based on the advance time offset, the frame typically reaches the gating point of the staging circuit when the time of the wall clock indicates the transmit time of the frame at which time the network station transmits the frame. In examples, determining the estimated DMA latency in frame scheduling reduces a number of frames in the staging circuit waiting to be transmitted and reduced frame transmission latency. Well known instructions, protocols, structures, and techniques have not been shown in detail in order not to obfuscate the description.

Example Systems

Figure 1:
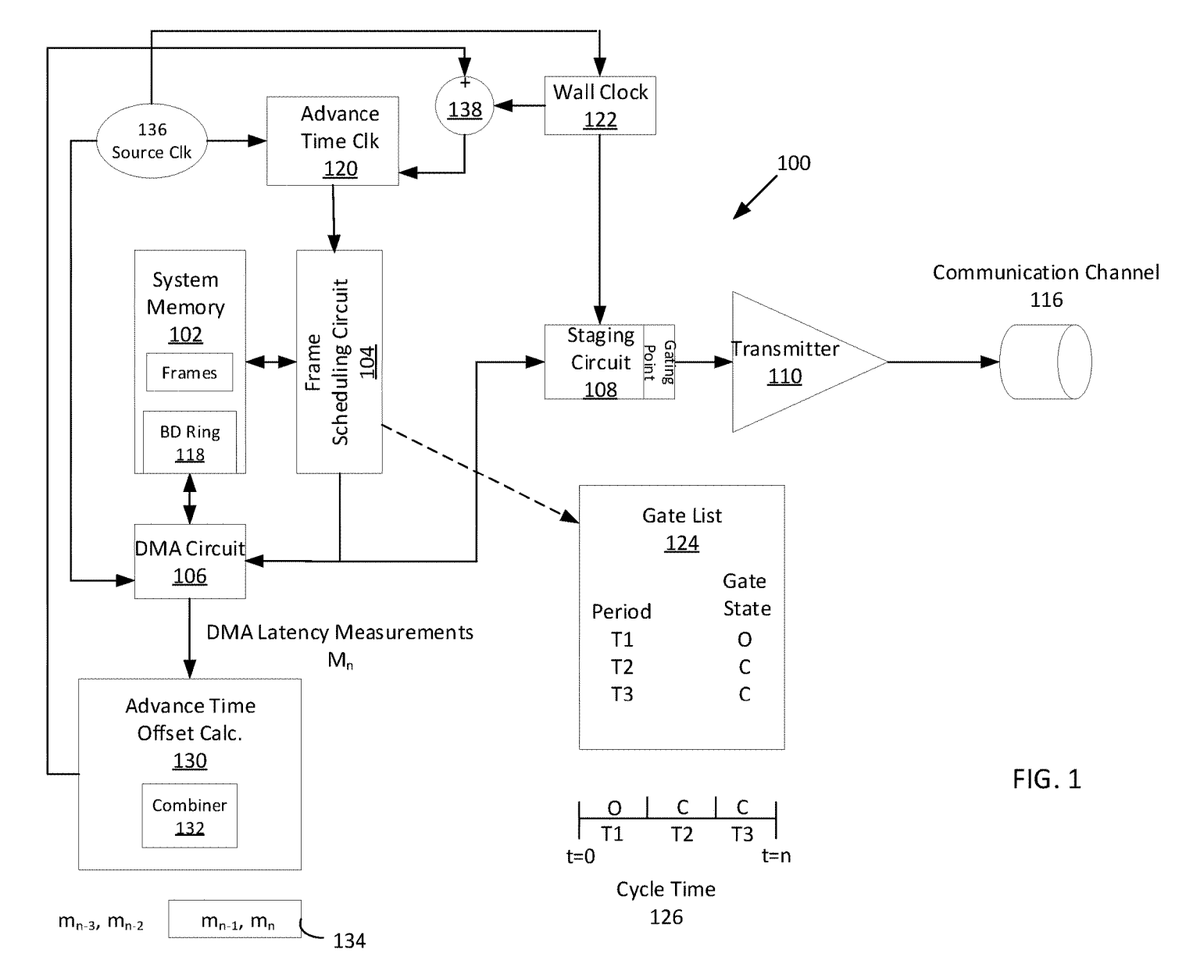
FIG. 1 illustrates an example network station arranged to perform time gate scheduling of time sensitive networking (TSN) in accordance with an embodiment.

FIG. 1 illustrates an example network station 100 arranged to perform time gate scheduling of time sensitive networking (TSN) in accordance with an embodiment. Time gate scheduling is defined by IEEE 802.1Q-2018 as Enhanced Transmission Selection (ETS). The network station 100 arranged to perform time gate scheduling transmits frames to devices on IEEE 802.1 local area networks with a determinism including guaranteed end-to-end latencies, limited latency fluctuations (jitter), and low frame loss.

In an example, the network station 100 may be a network switch or an end station such as a host. The network station 100 may comprise a system memory 102, a frame scheduling circuit 104, a direct memory access (DMA) circuit 106, a staging circuit 108, and a transmitter 110. Further, the network station 100 may have an advance time clock 120 and a wall clock 122 which each maintain a running counter time based on a source clock 136 such as a IEEE 1588 timer. In some examples, the source clock may be the same as the wall clock 122. The frame scheduling circuit 104 and staging circuit 108 may enable the network station 100 to transmit frames at predetermined times to meet the determinism of TSN. The transmitter 110 may be associated with physical layer processing of an open system interconnect (OSI) model which defines transmission over a communication channel 116 of a local area network. Components of the network station 100 and other components shown or not shown may be each implemented using circuitry such as analog circuitry, mix signal circuitry, memory circuitry, logic circuitry, processing circuitry arranged to execute code stored in a memory and when executed by the processing circuitry perform the disclosed functions, or combinations thereof.

A system memory 102 may store frames to be transmitted by the network station 100. The system memory 102 may include one or more types of memory such as local static read access memory (SRAM), local system dynamic random access memory (DRAM), or remote DRAM (e.g., accessed via a PCIe interface) each with different access latency. In an example, upper layers of the OSI model such as an application layer may generate frames which are stored in the system memory 102 for transmission by the network station 100. Further, the system memory 102 may have one or more buffer descriptor (BD) rings, an example of which is shown as BD ring 118 which stores descriptors pointing to memory addresses where the frames are stored in the system memory 102. In an example, access of a frame may comprise accessing a descriptor in the BD ring 118 which in turn is used to access the frame stored in the system memory 102. In an example, the frames associated with the BD ring 118 may have a same priority for transmission such as all of a low priority or all of a high priority. The low priority frames may be transmitted with higher latency compared to high priority frames in an example. Further, in examples, the system memory 102 may have a plurality of BD rings each associated with frames of a same priority and different BD rings being associated with frames of different priorities.

The frame scheduling circuit 104 may schedule frames stored in the system memory 102 for transmission by the network station 100 at predetermined times. In an example, the frame scheduling circuit 104 may begin by issuing a request to the DMA circuit 106 to retrieve a frame from the system memory 102. The DMA circuit 106 may facilitate memory access to the system memory 102 by offloading the memory access operations from the frame scheduling circuit 104. The request to the DMA circuit 106 may include a descriptor of the frame that the frame scheduling circuit 104 obtains from the BD ring 118. The DMA circuit 106 may use the descriptor to retrieve the frame. In examples, the DMA circuit 106 may have a latency associated with the retrieval due to the DMA circuit 106 accessing the frame directly from the system memory 102 or via the descriptors stored in the BD ring 118. The DMA latency is defined by a time between the DMA circuit issuing a request to read a data unit of a frame from the system memory 102 and the DMA circuit 106 receiving the data unit of the frame. In an example, the data unit may be at least a portion of data associated with a frame, and could be a 64 byte data unit in an example. The DMA latency may be measured by a difference in time based on the source clock 136 between issuing the request and receiving the data unit. Further, the DMA latency may vary depending on a type of memory in which the frame is stored. For example, the DMA latency to access the SRAM may be less than a time to access a DRAM of the system memory 102. In another example, the DMA latency may vary depending on a load on the DMA circuit 106 such as a number of DMA operations waiting to be performed by the DMA circuit 106 for the network station 100 and other network stations also having access to the system memory 102.

A DMA operation may retrieve a data unit of the frame, and a plurality of DMA operations is typically performed to retrieve a frame. After retrieving the frame, the DMA circuit 106 may output the frame to the staging circuit 108. The staging circuit 108 may have a queue for storing the frame until it is transmitted at a gating point at an exit of the staging circuit 108. The frame may propagate from an input of the staging circuit 108 through the queue of the staging circuit 108 and reach the gating point. A time period in a cycle time may determine when the frame at the gating point is transmitted. Example cycle time 126 may be a range of time starting at t=0 and ending at t=n (where n is an integer) comprising the one or more time periods during which the network station 100 may transmit a frame. Each time period may be associated with a gate state which is open or closed. If the gate state is open, a frame may be transmitted by the transmitter 110. Alternatively, if the gate state is closed, a frame will not be transmitted by the transmitter 110. In the example cycle time 126, the gate state may be open in the first time period T1 and closed in the remaining time periods T2, T3. Other variations are also possible.

The frame scheduling circuit 104 may refer to a gate list 124 that reflects the cycle time 126 to facilitate scheduling of the frame for transmission by initiating a frame DMA transaction by the DMA circuit 106. In an example, the frame scheduling circuit 104 may have a respective gate list for each priority of frames transmitted by the network station 100. Example gate list 124 may indicate the one or more time periods in the example cycle time 126 and a gate state associated with the time period for a particular priority of a frame transmitted by the network station 100. The example gate list 124 may define three periods T1-T3 of the cycle time 126 and a corresponding gate state which is open or closed. In the gate list 124, the gate state is open in periods T1 and closed in periods T2, T3. The frame scheduling circuit 106 may schedule a frame for transmission based on the time of the advance time clock 120 and if a gate state when the frame is scheduled for transmission is open. For example, the time of the advance time clock 120 may be modulo with a duration of the cycle time to provide a modulo result. A time period of the cycle time may be a range of times beginning from a start time and ending at an end time within the cycle time t=0 to t=n. The modulo result within the start time and end time may be within a time period. Further, if the gate list 124 indicates that the gate state is open for the time period, then the frame may be scheduled for transmission. This time when the gate state is open, i.e., the time of the advance time clock 120, may be a transmit time that is associated with metadata of the frame and stored in a memory of the network station 100. The frame scheduling circuit 104 may then issue a request to the DMA circuit 108 to access the frame from the system memory 102. If the gate list 124 indicates that the gate state is not open for the time period, then the frame will not be scheduled for transmission at the time of the advance time clock 120.

Based on the request by the frame scheduling circuit 104. the DMA circuit 106 may issue a request to the system memory 102 to retrieve the frame and output the frame to the staging circuit 108. The frame may propagate through the queue of the staging circuit 108 and reach the gating point. The frame may then wait at the gating point until the time of the wall clock 122 indicates the transmit time of the frame associated with the metadata of the frame at which time the gate state 128 is open and the transmitter 110 may transmit the frame. In some examples, the time of the wall clock 122 may be ahead of the transmission time of the frame when the frame reaches the gating point due to longer than expected DMA latency in the frame reaching the gating point. The gating point may immediately transmit the frame when it reaches the gating point in this example.

The time of the advance time clock 116 may be ahead of time of the wall clock 114 by a worst case frame retrieval time from the system memory 102 so that the frame reaches the gating point before the transmit time indicated by the wall clock 122 and the frame is able to be transmitted at the transmit time. A frame retrieval time is a time to retrieve a frame from the system memory 102 based on one or more direct memory access (DMA) operations by the DMA circuit 106. Each DMA operation retrieves a portion of a frame, referred to as a data unit, and a plurality of DMA operations is typically performed to retrieve a frame. Further, each DMA operation has a DMA latency. The DMA latency is defined as a time between the DMA circuit 106 issuing a request to read a data unit of the frame from the system memory 102 and the DMA circuit receiving the data unit from the system memory 102. The worst case frame retrieval time is a worst case time to retrieve a frame from the system memory 102 and is based on a worst case DMA latency of the DMA circuit 106. The time of the advance time clock 116 being ahead of time of the wall by the worst case frame retrieval time results in increased number of frames in the staging circuit 108 waiting to be transmitted. Further, determining the worst case latency is difficult because the latency varies with a load associated with the DMA circuit 106.

Embodiments disclosed herein are directed to determining an advance time offset of the advance time clock 120 which is based on an estimated frame retrieval time and advancing the time of the advance time clock 120 ahead of the time of the wall clock 122 by the advance time offset instead of the worst case frame retrieval time. The estimated frame retrieval time is based on an estimated DMA latency and is determined by an advance time offset calculator 130.

The advance time offset calculator 130 may receive a respective DMA latency measurement Mn for accessing a data unit such as a 64 byte data unit from the system memory 102 where n is an integer index. A latency measurement combiner 132 in the advance time offset calculator 130 may combine the latency measurements received over a window of time 134. The window of time 134 includes two or more DMA latency measurements $m_n$, and $m_{n-1}$ received during the window of time where $m_n$, may represent a more recent DMA latency measurement and $m_{n-1}$ may represent an earlier DMA latency measurement and the combination may be an average of the DMA latency measurements. In one example, each DMA latency measurement received over the window of time may be equally weighted and averaged to determine the estimated DMA latency. In another example, each DMA latency measurement received over the window of time may be unequally weighted such that those more recently received DMA latency measurements may be weighted more heavily than earlier received DMA latency measurements to determine the estimated DMA latency. The weighing may be based on an exponential weighted average (EWA) function such that more recent DMA latency measurements may be weighted more heavily than later DMA latency measurements in accordance with an exponential function. Further, if the window of time includes most recent two more latency measurements, the average may be moving average or weighted moving average (WMA) of DMA latency measurements to account for changes in the DMA latency measurements over time.

The advance time offset may be based on the estimated frame retrieval time which is in turn based on the estimated DMA latency. In one example, the advance time offset may be equal to the estimated frame retrieval time. In another example, the advance time may be equal to the estimated frame retrieval time further adjusted by a delay of the staging circuit 108. The delay may be a fixed delay in the staging circuit 108 from a time a frame enters the staging circuit 108 and to when the frame reaches the gating point of the staging circuit 108 for transmission. In some examples, a correction factor may be added to the fixed delay to account for one-off DMA latency of a data unit which takes longer than the estimated DMA latency to access. Further, since the average is based on the moving average or weighted moving average, the advance time offset may dynamically change to account for changes in the estimated DMA latency of the DMA circuit and the advance time offset may be a dynamic advance time offset.

In an example, the advance time offset may be summed by a summer 138 with the time of the wall clock 122 to define the time of the advance time clock 120. The summer 138 may sum the advance time offset with the time of the wall clock 122 to define the time of the advance time clock 120 which continues to be updated as additional latency measurements are made. In some examples, a difference between the advance time offset in a current time interval and a previous advance time offset summed by the summer 138 may be no greater than a predefined value to avoid large changes to the time of the advance time clock 120. If the difference is greater than the predefined value, then the advance time offset provided to the summer 138 in the current time interval may be reduced so that the difference between the reduced advance time offset and the previous advance time offset summed by the summer 138 is no greater than a predefined value. In an example, the previous advance time clock offset may be a last advance time clock offset provided to the summer 138 in a time interval immediately prior to the current interval and the reduction of the advance time offset in the current time interval may prevent large changes in the time of the advance time clock 120 based on the summer 138. The advance time offset is updated as the DMA circuit 106 retrieves additional data units from the system memory 102. Further, the advance time offset based on the estimated DMA latency in these embodiments is smaller than the worst case frame retrieval time and results in a smaller number of frames in the queue of the staging circuit 108 and reduced delay until a frame is transmitted.

Figure 2:
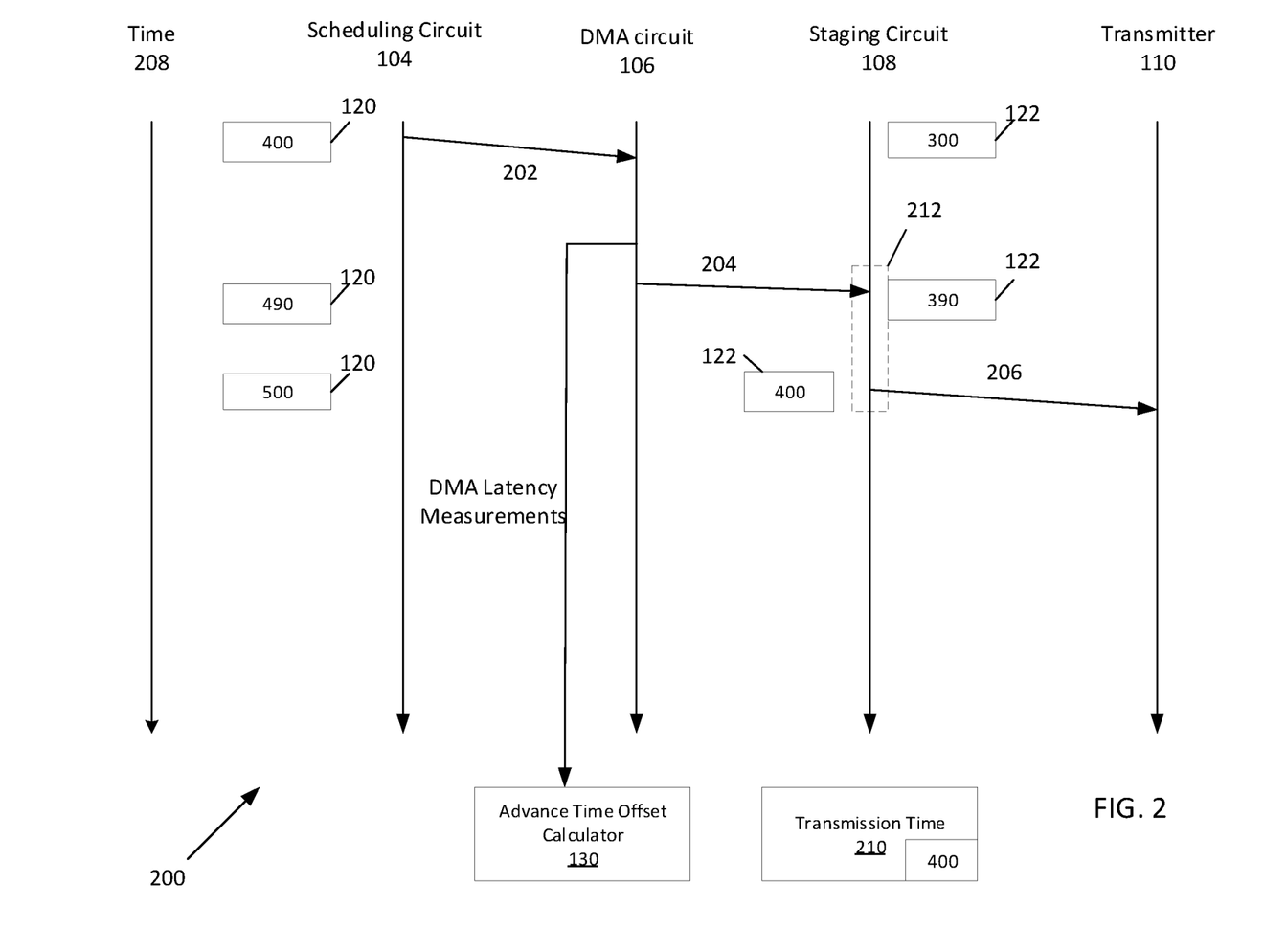
FIG. 2 illustrates an example timing diagram of frame scheduling and frame transmission performed by the network station in accordance with an embodiment.

FIG. 2 illustrates an example timing diagram 200 of frame scheduling and frame transmission performed by the network station 100 in accordance with an embodiment. The scheduling of a frame for transmission may be based on a time of the advance time clock 120 and the transmission of the frame may be based on a time of the wall clock 122. The timing diagram 200 may describe operations of the frame scheduling circuit 104, DMA circuit 106, staging circuit 108, and transmitter 110 as a function of time along a vertical axis 208. Further, the operations of the frame scheduling circuit 104 and the staging circuit 108 may be based on the time of the advance time clock 120 and wall clock 122, respectively. The time of the advance time clock 120 may be ahead of the time of the wall clock 122 by the advance time offset specified by one or more of the estimated DMA latency of the DMA circuit 106 and the fixed pipeline delay of the staging circuit 108.

To illustrate operation of the network station 100 in an example, the wall clock 122 may be set with an initial example time of 300 and the advance time clock 120 may be set with an initial example time of 400. The difference in time of 100 may indicate an example advance time offset based on the estimated frame retrieval time and the fixed delay of the staging circuit 108. The frame scheduling circuit 104 may issue a frame request 202 to the DMA circuit 104 to access the frame at the initial time 400 of the advance time clock 120. Further, the frame scheduling circuit 104 may assign a transmit time of 400 to the frame. The transmit time may be based on the time of the advance time clock 120 when a gate state at the gating point in the staging circuit 108 may be open. In an example, the frame scheduling circuit 104 may assign the transmit time to be 400 which is stored as metadata associated with the frame in a memory 210 of the network station 100.

The DMA circuit 106 may access the frame from the system memory 102 and provide the frame to the staging circuit 108 in a frame response 204 which includes the frame. One or more of the time that the DMA circuit 106 takes to provide the frame to the staging circuit 108 may be approximately equal to the advance time offset. For example, the frame may reach the gating point in a range of time 212 which extends up to the transmission time. The staging circuit 108 may receive the frame when the advance time clock 122 has a time of 490 and the wall clock has a time of 390. At 206, the staging circuit 108 may then provide the frame to the transmitter 110 when the time of the wall clock 122 reaches 400 in this example which is the transmit time assigned by the frame scheduling circuit 104. Based on the advance time offset between the wall clock 122 and the advance time clock 120 specified accordance with the embodiments, the frame may reach the gating point of the staging queue 108 in the window of time 212 just before the transmit time and the transmitter 110 may transmit the frame at the transmit time indicated by the advance time clock 120.

In examples, the advance time offset may be based on measures of the estimated DMA latency to access the system memory 102. For example, the DMA circuit 106 may measure a time between when the DMA is initiated for a data unit such as a frame or portion of a frame from the system memory 102 and when the DMA circuit 106 receives the data unit from the system memory 102 based on the source clock 136. A difference in these times is a DMA latency measurement.

The DMA latency measurement may be provided to the dynamic advance time offset calculator 130 to determine the estimated frame retrieval time. The estimated frame retrieval time may be based on the estimated DMA latency of the DMA circuit 106 determined by combining the DMA latency measurement with other DMA latency measurement of other data units accessed by the DMA circuit 106 from the system memory 102 over a window of time. The combination may be an average or weighted average indicative of the estimated DMA latency of the DMA circuit 106. The process of determining latency for a data unit accessed by the DMA circuit 106 and averaging the determined latencies is repeated over a window of time determine a moving average DMA latency as DMA latency measurements of more recent data units is received and advance time offset which dynamically changes.

In an example, the estimated frame retrieval time may be calculated based on the estimated DMA latency of the DMA circuit 106, a frame size of frames retrieved by the DMA circuit 106, and a size of the data unit which is received by the DMA circuit 106. In an example, the frame size may be a maximum size frame programmed as a maximum transmission unit (MTU) value and the size of the data unit may be programmed as a maximum burst size. Further, the DMA circuit 106 may be able to issue one or more DMA requests to retrieve data units in parallel which is referred to as an outstanding transaction (OT) characteristic of the DMA circuit 106. With an estimated DMA latency of 500 ns as an example, an MUT=1500 bytes as an example, a maximum burst size of 64 bytes as an example, and an OT=2 as an example, the dynamic advance time offset calculator 130 may determine the estimated frame retrieval time as:

(MTU/Max_burst_size)*(Estimated DMA latency/
    OT)=(1500/64)*(500/2)=5859 nanoseconds.

In some examples, a frame in the staging circuit 108 that reach the gating point with a transmit time which is earlier than the time of the wall clock 122 means that the frame reached the gating point too late and the advance time offset added to the time of the source clock 118 is less than a time that it takes for a frame to be retrieved from the system memory 102 and reach the gating point. When this condition is detected, one or more of the fixed delay or averaging of DMA latencies may be adjusted so that advance time offset provided to the summer 138 results in the frames at the gating point in the staging circuit 108 being transmitted by the respective transmit time. The fixed delay associated with the staging circuit 108 may be adjusted so that a transmit time of frames output by the staging circuit 108 matches the time of the wall clock 122. Further, a weighing of the DMA latencies in the averaging to determine the estimated DMA latency may be adjusted to better reflect the estimated DMA latency. Other adjustments may also be made.

Example Methods

Figure 3:
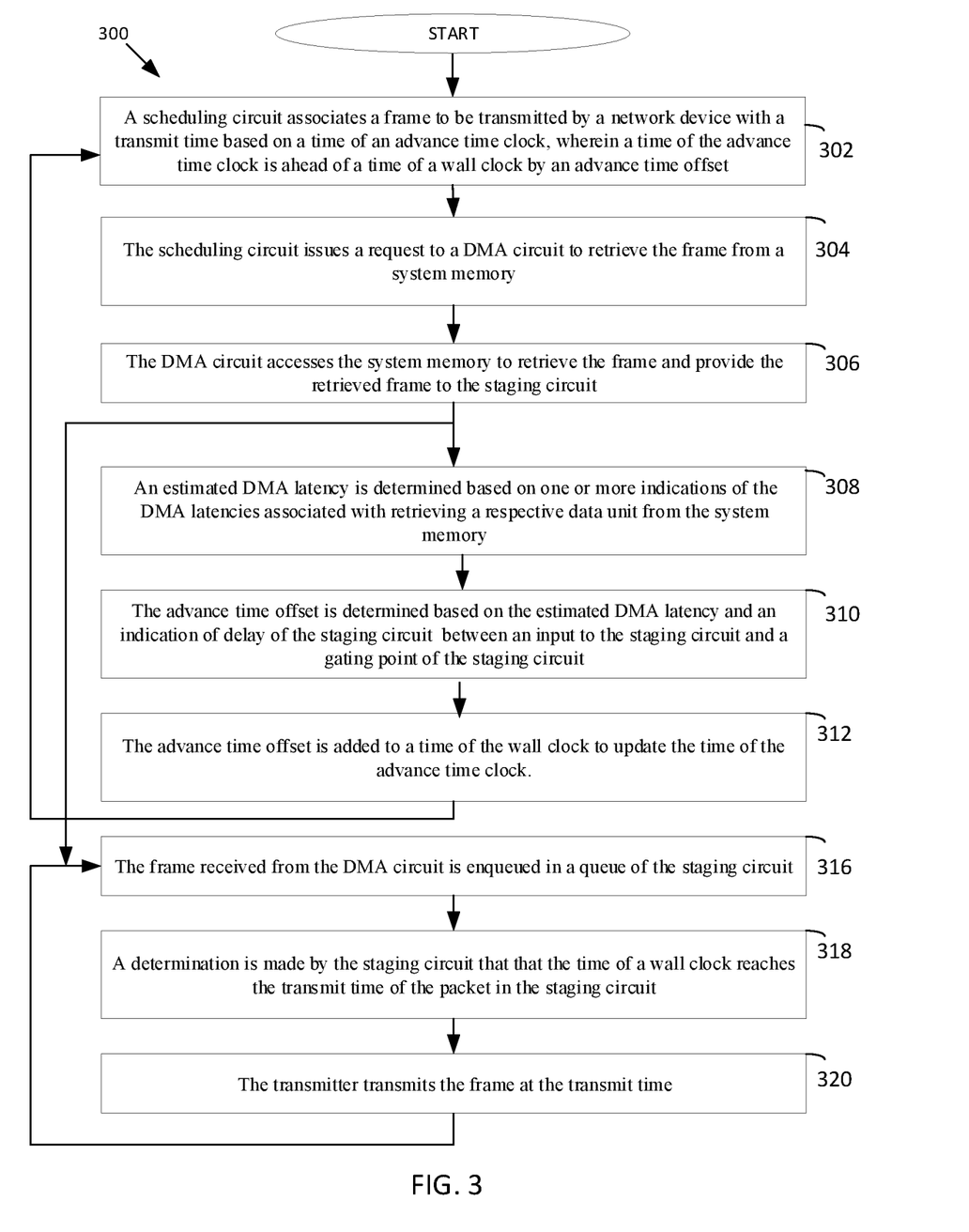
FIG. 3 is a flow chart of example functions associated with frame scheduling and frame transmission performed by the network station in accordance with an embodiment.

FIG. 3 is a flow chart of example functions 300 associated with frame scheduling and frame transmission performed by the network station 100 in accordance with an embodiment. Functions 300 may be performed by one or more of the frame scheduling circuit 104, DMA circuit 106, dynamic advance time offset calculator 130, transmitter 110 and staging circuit in an example.

At 302, a frame scheduling circuit 104 associates a frame to be transmitted by the network station 100 with a transmit time based on a time of an advance time clock 120. In examples, a time of the advance time clock 120 may be ahead of a time of the wall clock 122 by an advance time offset. At 304, the frame scheduling circuit issues a request to a DMA circuit 106 to retrieve the frame from a system memory 102. At 306, the DMA circuit 104 accesses the system memory to retrieve the frame and provides the retrieved frame to the staging circuit. Processing then continues to steps 308 and 316.

At 308, an estimated DMA latency is determined based on the one or more indications of the DMA latencies associated with retrieving a respective data unit from the system memory 102. The data unit may be a 64 byte unit of data retrieved by the DMA circuit 106 and a portion of a frame in an example. At 310, the advance time offset is determined based on the estimated DMA latency and an indication of delay of the staging circuit 108 between an input to the staging circuit 108 and a gating point of the staging circuit 108. At 312, the advance time offset is added to a time of the wall clock 122 to update the time of the advance time clock 120, where time of the advance time clock 120 is ahead of the time of the wall clock 122 by the advance time offset. Processing returns to step 302.

At 316, the frame received from the DMA circuit 104 is enqueued in a queue of the staging circuit 108. At 318, a determination is made by the staging circuit 108 that the time of a wall clock 122 reaches the transmit time of the frame in the staging circuit 108. At 320, the transmitter transmits the frame at the transmit time. Processing then returns back to step 316 to receive another frame.

In examples, setting the advance time clock 120 to be ahead of the wall clock 122 by an advance time offset results a frame reaching the gating point of the staging circuit 106 before or at the time of the wall clock 122 reaches the transmit time. Further, setting the advance time clock 120 to be ahead of the wall clock 122 results in a reduced number of internally buffered frames in the staging circuit 108 which has not yet reached the gating point and reduced frame transmission latency compared to the advance time offset being based on a worst case frame retrieval time.

The frame scheduling circuit 104 described in the above examples may be a time gate scheduling circuit associated with TSN which determines the transmit time of the frame retrieved from the system memory 102 based on the gate list 124 and the time of the disclosed advance time clock 120. The frame scheduling circuit 104 may determine the transmit time of the frame retrieved from the system memory 102 in ways other than based on the gate list 124. For example, the frame scheduling circuit 104 may set the time transmit time of the frame based on time-based criteria to achieve traffic shaping of the frames transmitted by the network station 100 and the time of the disclosed advance time clock 120. The transmit time may be set in other ways as well.

In an embodiment, a method for transmitting a frame in a network station is disclosed. The method comprises scheduling the frame for transmission at a transmit time based on a first clock; issuing a request to a direct memory access (DMA) circuit to retrieve the frame from a system memory; determining an advance time offset associated with the first clock based on an estimated DMA latency of the DMA circuit; providing the frame retrieved by the DMA circuit to a staging circuit; determining that a time of a second clock reaches the transmit time of the frame in the staging circuit, wherein a time of the first clock is ahead of a time of the second clock by the advance time offset; and transmitting the frame at the transmit time based on the determination that the time of the second clock reaches the transmit time. In an example, the estimated DMA latency is based on measuring a respective DMA latency to retrieve a plurality of data units from the system memory in a window of time and combining the DMA latency measurements. In an example, combining the DMA latency measurements comprises averaging the DMA latency measurements. In an example, the averaging the DMA latency measurements comprises weighing the DMA latency measurements by a weighting function in the average. In an example, the weighting function comprises weighing older measurements of DMA latencies less than recent measurements of DMA latencies in the average. In an example, the weighting function is based on an exponential function. In an example, the window of time includes a respective DMA latency associated with a most recent data unit retrieved from the system memory. In an example, determining the advance time offset associated with the first clock comprises determining an estimated frame retrieval time based on the estimated DMA latency and summing with a delay of the staging circuit. In an example, the delay is a time for the frame to travel from an input of the staging circuit to a gating point in the staging circuit; and wherein the frame is transmitted by the transmitter if the time of the second clock reaches the transmit time. In an example, the method further comprises adjusting the advance time offset based on the transmit time being earlier than the time of the second clock when the frame reaches the gating point. In an example, the adjustment comprises increasing the delay. In an example, the adjustment comprises adjusting a weighing of the DMA latency measurements of the combination of the DMA latency measurements. In an example, the data unit is at least a portion of a frame. In an example, the advance time offset is adjusted based on a difference with a previously determined advance time offset. In an example, the time of the first clock and the time of the second clock is derived from a time of an IEEE 1588 source clock.

In another embodiment, a network station is disclosed. The network station comprises: a system memory; a direct memory access (DMA) circuit; a first clock; a second clock; a transmitter; a frame scheduling circuit arranged to schedule a frame for transmission at a transmit time based on a first clock; and issuing a request to the DMA circuit to retrieve the frame from the system memory; an advance time offset calculator arranged to determine an advance time offset associated with the first clock based on an estimated DMA latency of the DMA circuit; a staging circuit arranged to receive the frame retrieved by the DMA circuit; determine that a time of a second clock reaches the transmit time of the frame in the staging circuit, wherein a time of the first clock is ahead of a time of the second clock by the advance time offset; and provide the frame at the transmit time to the transmitter based on the determination that the time of the second clock reaches the transmit time; and the transmitter arranged to transmit the frame. In an example, the estimated DMA latency is based on the DMA circuit arranged to measure a respective DMA latency to retrieve a plurality of data units from the system memory in a window of time and the advance time offset calculator being arranged to combine the DMA latency measurements. In an example, the advance time offset calculator arranged to combine the DMA latency measurements comprises the advance time offset calculator arranged to average the DMA latency measurements. In an example, the advance time offset calculator arranged to average the DMA latency measurements comprises the advance time offset calculator arranged to weigh the DMA latency measurements by a weighting function in the average, wherein the weighting function comprises weighing older measurements of DMA latencies less than recent measurements of DMA latencies in the average. In an example, the advance time offset calculator arranged to determine the advance time offset associated with the first clock comprises the advance time offset calculator arranged to determine an estimated frame retrieval time based on the estimated DMA latency and summing with a delay of the staging circuit.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for transmitting a frame in a network station, the method comprising:
   scheduling the frame for transmission at a transmit time based on a first clock;
   issuing a request to a direct memory access (DMA) circuit to retrieve the frame from a system memory;
   determining an advance time offset associated with the first clock based on an estimated DMA latency of the DMA circuit;
   providing the frame retrieved by the DMA circuit to a staging circuit;
   determining that a time of a second clock reaches the transmit time of the frame in the staging circuit, wherein a time of the first clock is ahead of a time of the second clock by the advance time offset; and
   transmitting the frame at the transmit time based on the determination that the time of the second clock reaches the transmit time; wherein the estimated DMA latency is based on measuring a respective DMA latency to retrieve a plurality of data units from the system memory in a window of time and combining the DMA latency measurements; wherein combining the DMA latency measurements comprises averaging the DMA latency measurements; wherein the averaging the DMA latency measurements comprises weighing the DMA latency measurements by a weighting function in the average; and, wherein the weighting function comprises weighing older measurements of DMA latencies less than recent measurements of DMA latencies in the average.

2. The method of claim 1, wherein the weighting function is based on an exponential function.

3. The method of claim 1, wherein the window of time includes a respective DMA latency associated with a most recent data unit retrieved from the system memory.

4. The method of claim 1, wherein determining the advance time offset associated with the first clock comprises determining an estimated frame retrieval time based on the estimated DMA latency and summing with a delay of the staging circuit.

5. The method of claim 1, wherein the data unit is at least a portion of a frame.

6. The method of claim 1, wherein the advance time offset is adjusted based on a difference with a previously determined advance time offset.

7. The method of claim 1, wherein the time of the first clock and the time of the second clock is derived from a time of an IEEE 1588 source clock.

8. A method for transmitting a frame in a network station, the method comprising:
   scheduling the frame for transmission at a transmit time based on a first clock;
   issuing a request to a direct memory access (DMA) circuit to retrieve the frame from a system memory;
   determining an advance time offset associated with the first clock based on an estimated DMA latency of the DMA circuit;
   providing the frame retrieved by the DMA circuit to a staging circuit;
   determining that a time of a second clock reaches the transmit time of the frame in the staging circuit, wherein a time of the first clock is ahead of a time of the second clock by the advance time offset; and
   transmitting the frame at the transmit time based on the determination that the time of the second clock reaches the transmit time, wherein the estimated DMA latency is based on measuring a respective DMA latency to retrieve a plurality of data units from the system memory in a window of time and combining the DMA latency measurements; wherein determining the advance time offset associated with the first clock comprises determining an estimated frame retrieval time based on the estimated DMA latency and summing with a delay of the staging circuit; and, wherein the delay is a time for the frame to travel from an input of the staging circuit to a gating point in the staging circuit; and wherein the frame is transmitted by the transmitter if the time of the second clock reaches the transmit time.

9. The method of claim 8, further comprising adjusting the advance time offset based on the transmit time being earlier than the time of the second clock when the frame reaches the gating point.

10. The method of claim 9, wherein the adjustment comprises increasing the delay.

11. The method of claim 9, wherein the adjustment comprises adjusting a weighing of the DMA latency measurements of the combination of the DMA latency measurements.

12. A network station comprising:
a system memory;
a direct memory access (DMA) circuit;
a first clock;
a second clock;
a transmitter;
a frame scheduling circuit arranged to schedule a frame for transmission at a transmit time based on a first clock; and issuing a request to the DMA circuit to retrieve the frame from the system memory;
an advance time offset calculator arranged to determine an advance time offset associated with the first clock based on an estimated DMA latency of the DMA circuit;
a staging circuit arranged to receive the frame retrieved by the DMA circuit; determine that a time of a second clock reaches the transmit time of the frame in the staging circuit, wherein a time of the first clock is ahead of a time of the second clock by the advance time offset; and provide the frame at the transmit time to the transmitter based on the determination that the time of the second clock reaches the transmit time; and
the transmitter arranged to transmit the frame;
wherein the estimated DMA latency is based on the DMA circuit arranged to measure a respective DMA latency to retrieve a plurality of data units from the system memory in a window of time and the advance time offset calculator being arranged to combine the DMA latency measurements;
wherein the advance time offset calculator arranged to combine the DMA latency measurements comprises the advance time offset calculator arranged to average the DMA latency measurements; and
wherein the advance time offset calculator arranged to average the DMA latency measurements comprises the advance time offset calculator arranged to weigh the DMA latency measurements by a weighting function in the average, wherein the weighting function comprises weighing older measurements of DMA latencies less than recent measurements of DMA latencies in the average.

13. The network station of claim 12, wherein the estimated DMA latency is based on the DMA circuit arranged to measure a respective DMA latency to retrieve a plurality of data units from the system memory in a window of time and the advance time offset calculator being arranged to combine the DMA latency measurements.

14. The network station of claim 13, wherein the advance time offset calculator arranged to combine the DMA latency measurements comprises the advance time offset calculator arranged to average the DMA latency measurements.

15. The network station of claim 12, wherein the advance time offset calculator arranged to determine the advance time offset associated with the first clock comprises the advance time offset calculator arranged to determine an estimated frame retrieval time based on the estimated DMA latency and summing with a delay of the staging circuit.

* * * * *